United States Patent Office 3,219,376
Patented Nov. 23, 1965

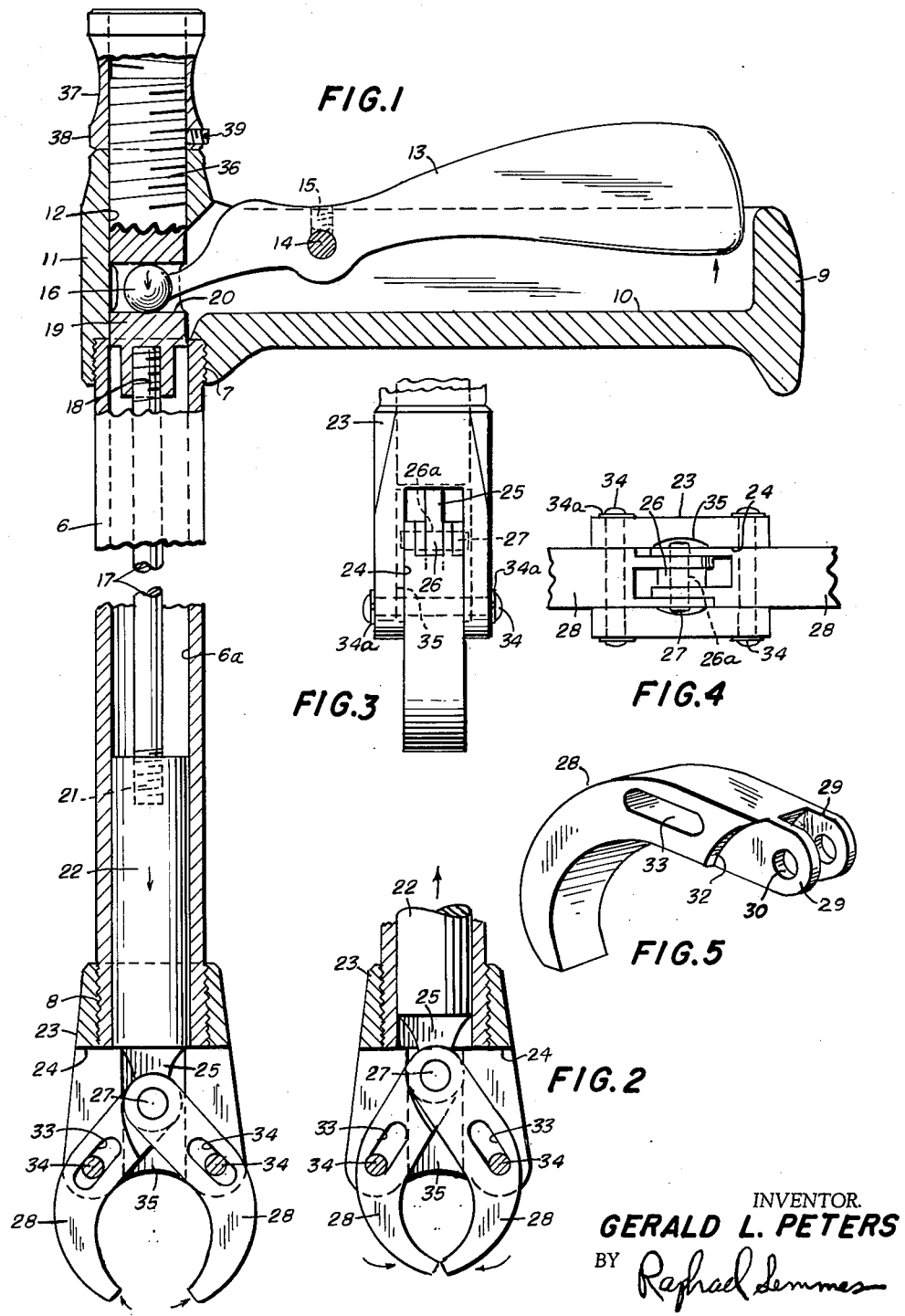

3,219,376
REMOTE CONTROL ARTICLE HANDLING TOOL
Gerald L. Peters, 530 Old Trail Road, Beech Island, S.C.
Filed Jan. 25, 1963, Ser. No. 253,956
4 Claims. (Cl. 294—16)

This invention relates to an object handling device, and consists more particularly in new and useful improvements in a manually operated tool for the remote handling of various objects. Although the tool was primarily designed and intended for handling nuclear materials and the like, the principle of operation embodied therein may be readily adapted for use in various other fields, including cystoscopic instruments in surgery.

A number of industrial and technical processes require the handling of objects by remote control. For example, in the field of nuclear science, certain substances are placed in a nuclear reactor for exposure to neutron flux, to be irradiated within the reactor core, and in order to avoid the exposure of the operator to the effects of radiation, it is necessary that a highly efficient, remotely controlled tool be employed.

It is the primary object of this invention to provide such a tool which is positive in action, easily manipulated for seizing, moving and then releasing a remote object.

Another object of the invention is to provide a remote control handling tool comprising a minimum of parts which may be readily assembled and disassembled, and is sufficiently rugged to meet its intended requirements.

A further object of the invention resides in the means for producing a maximum degree of leverage in gripping an object, with a minimum of manual force to thereby facilitate ease of handling.

Still another object of the invention is to provide a remote control handling tool of this character including means for adjusting the range of jaw opening, thus reducing the necessary movement of the manual control element in the handling of constant sizes.

With the above and other objects in view which will appear as the description proceeds, the invention consists in the novel features herein set forth, illustrated in the accompanying drawings, and more particularly pointed out on the appended claims.

Referring to the drawings in which numerals of like character designate similar parts throughout the several views:

FIG. 1 is a longitudinal sectional view of one form of handling device embodying the present invention, with the jaws in partially open position;

FIG. 2 is a similar fragmentary sectional view showing the gripping jaws in closed position;

FIG. 3 is a view at right angles to FIG. 2;

FIG. 4 is a bottom end view of the gripping element; and

FIG. 5 is an enlarged detailed perspective view of one of the gripping jaws.

In the drawings, referring first to FIG. 1, 6 is an elongated tube preferably formed of suitable metal and threaded as at 7 and 8 at its upper and lower longitudinal extremities, respectively. A handle grip member 9, having an elongated, trough-like recess 10 in its upper side extending substantially from end to end thereof, is mounted on the uper end of the tube 6 by means of an integral boss 11 provided with a vertical bore 12 extending through the boss at right angles to the recess 10. The lower extremity of the boss 11 is internally threaded to engage the upper threads 7 on the tube 6; and the bore 12, when the handle is in place on the tube 6, forms a continuation of the central bore 6a of the tube 6.

A handle lever 13 is pivoted as at 14 for movement within the recess 10, the pivot pin 14 extending transversely through the spaced walls of the recess 10 in the handle grip portion, and a set screw 15 may be provided for removably securing the pivot pin 14 in place. The forward end of the handle lever 13 is reduced and provided with an actuating ball 16 which extends through the adjacent open end of the recess 10 and terminates substantially centrally of the bore 12 in the boss 11. Thus, upon the downward pivotal movement of the handle lever 13, the ball 16 is elevated in bore 12, and upon the upward movement of said lever, the ball is lowered for the purpose hereinafter set forth.

Within the tube 6 there is provided a centrally disposed, longitudinally extending jaw actuating assembly comprising a rod 17 threaded at its upper end as at 18 to engage complementary internal threads in a cylindrical head 19 which is reciprocably mounted for vertical movement in the bore 12 of the boss 11. A transverse slot 20 extends through the head 19 and receives the ball end 16 of the handle lever 13 with an operating clearance, so that upon the movement of the handle lever 13 about its pivot 14, the head 19 and rod 17 partake of a vertical movement corresponding to that of the ball 16.

The opposite end of the rod 17 is threaded as at 21 to engage complementary internal threads in a guide cylinder 22 which is arranged with a sliding fit in the bore 6a of the tube 6 adjacent the lower end of the latter. Thus, by means of the head 19 and cylinder 22, the actuating rod 17 is maintained centrally within the bore 6a and its vertical movement is stabilized.

A bifurcated jaw housing 23 is internally threaded at its circular upper end to engage the threads 8 on the lower end of the tube 6, its lower end, which preferably flares slightly, being provided with a transverse, vertically extending slot 24 which is open at its lower extremity to accommodate the jaws of the handling tool. A pivot mount 25 is integrated with the lower extremity of the cylinder 22 and is vertically projectible and retractible with respect to the housing slot 24. This pivot mount 25 is provided with an integral pivot receiving eye 26 which is of reduced thickness and transversely drilled as at 26a (FIGS. 3 and 4) for receiving a main pivot pin 27 which, as will later appear, is the sole pivotal fastening of the jaws to the jaw actuating assembly.

A pair of coacting jaws 28 are bifurcated at one end as at 29 (FIG. 5) and transversely drilled as at 30 so that when their bifurcated ends are interfitted with one another and with the pivot receiving eye 26 of the mount 25, their respective bores collectively receive the pivot pin 27. As best seen in FIGS. 4 and 5, opposite outer faces of the bifurcated ends of respective jaw members are cut out as at 32 to provide the interfitting relationship above referred to, and, at the same time, to maintain the parallel alignment of opposed jaws.

Intermediate their ends, the jaws are provided with elongated cam slots 33 which extend through respective jaws and are directed at downwardly diverging angles with respect to the axis of common pivot pin 27. Camming pins 34 extend through the lower end of the jaw housing 23 with their intermediate portions traversing the housing slot 24, and slidably embracing respective slots 33 in jaws 28. As will be seen from FIGS. 1 and 2, the pins 34 are fixed with respect to the jaw housing 23, and upon vertical movement of the operating rod 17 and cylinder 22, the engagement of the slots 33 with the pins 34 causes a camming action on the jaws 28 due to the progressively changing angles of the slots 33 in relation to each other, thus steadily increasing the available leverage.

With regard to the main pivot pin 27, it should be noted that in order to facilitate assembly and disassembly of the jaws and pivot mount, this main pivot pin has an uninterrupted peripheral surface, devoid of any head or enlargement at either end. This pin extends slightly beyond the outer faces of the respective jaw members 28, as seen in FIGS. 3 and 4, and in order to accommodate these protruding ends, the adjacent spaced cheeks of the slotted head 23 are provided with vertical grooves 35 opening into the central slot 24. Thus, the pin 27 is confined within the slot 24 during the normal operation of the jaw members, but when the rod 17 and cylinder 22 are projected to their extreme downward position with the pivot eye 26 disposed below the lower extremity of the head 23, the pin 27 can be slid out of the pivot openings of the jaw members and pivot eye in either direction.

With this arrangement, it will be apparent that the coacting jaw members and their common pivot are closely confined within the slot 24, and the side faces of the jaw members are in sliding engagement with the opposed inner cheeks of the slotted head so as to stabilize the action of the jaw members and minimize any side movement thereof.

The extent of opening of the jaws 28 is controlled by the downward movement of the actuating assembly comprising the head 19, the operating rod 17, and the guide cylinder 22, all of which are longitudinally connected as previously described. In order to determine the extent of this opening of the jaws and to enable an operator to adjust such extent of opening so as to simplify the handling of various groups of objects of different constant sizes, it is desirable to have some adjustable means for limiting the downward movement of the actuating assembly. One such means is shown in FIG. 1 where the upper end of the head 19 is threaded as at 36 to receive a complementary, internally threaded adjusting cap 37. The lower extremity of the cap 37 is slightly flanged as at 38 to provide an abutment with the upper extremity of the head 19, and may be provided with a set screw 39 to maintain a selective adjustment. By retracting the set screw 39 and turning the adjusting cap 37 in clockwise direction on the threaded end 36 of the head 19, it will be apparent that the downward movement of the head 19 and rod 17 will be restricted and limited to the extent defined by the position of the flange 38 on the head 19. The jaws will open no further than permitted by the abutment of flange 38. Similarly, by turning the adjusting screw 37 counterclockwise on the threads 36, the cap will be backed off of the head 19 to permit a maximum downward movement of the actuating assembly. Thus, the limit of the opening of the jaws 28 may be easily adjusted from a maximum to a minimum extent at the will of the operator for ease of handling a plurality of articles of constant size.

To facilitate assembly and disassembly of the tool, the cam pins 34 may have their protruding longitudinal extremities peripherally grooved to receive suitable lock rings 34a. Thus, in order to disassemble the tool, the handle lever 13 may be removed by retracting the set screw 15 and withdrawing the pivot pin 14, so as to enable the ball end 16 of the lever to be removed from the slot 20 in head 19. The lock rings 34a are removed from the cam pins 34 which may then be withdrawn from their openings. Then, by removing the adjusting cap 37 from the threaded end 36 of the head 19, the entire operating assembly, including the head 19, actuating rod 17, and cylinder 22 may be withdrawn from the lower end of the tube 6. With the pivoted ends of the jaws 28 withdrawn from the slotted housing 23, the main pivot pin 27 can be easily withdrawn from the unit.

In operation, this tool is generally used in handling articles located downwardly with respect to the position occupied by the operator, and due to the weight of the jaw actuating assembly 17, 19 and 22, said assembly naturally slides downwardly in the tube 6, which automatically maintains the jaws 28 in a normally open position. Then, by depressing the handle lever 13, the operating assembly is raised in the tube to close the jaws which are retained in closed position so long as the handle lever 13 is depressed. When it is desired to release an article held by the jaws, a relaxing of the grip on the handle lever 13 permits the jaws to automatically open due to the weight of the actuating assembly, as before stated.

In the event of some unforeseen mishap causing a malfunctioning of the tool while gripping an irradiated isotope, for example, the jaws can be released by forcefully pressing down on the adjusting cap 37 to lower the actuating assembly. In fact, if by simply pressing down, the jaws will not open, a hammer or some other instrument may be used to depress the actuating assembly.

While I have shown and described the means for adjustment as comprising a screw threaded adjustment cap 37 for regulating the abutment of flange 38 with the handle boss 11, a generally similar result may be obtained by forming the cap 37 integrally with the head 19. With such an arrangement, adjustment may be effected by removing the set screw 15, withdrawing the handle pivot pin 14 and removing the handle lever 13, so that the ball 16 is free of the slot 20 in head 19. The length of the jaw actuating assembly can then be adjusted by means of the screw threaded connections 18 and 21 for the actuating rod 17 so that the overall length of the assembly and the point of abutment of the flange 38 with the boss 11 may be selectively regulated.

With either of these arrangements, it is to be noted that the engagement of the ball projection 16 of the handle lever with the actuating assembly head 19, through slot 20, provides an important safety factor in that after the device is assembled, any rotation of the elements comprising the actuating assembly is prevented. In other words, the ball 16, through its engagement with the slot 20 in head 19, prevents rotation of the head, and the engagement of the jaws within the bifurcated end of the housing 23 prevents rotation of the cylinder 22, so that relative rotation of these parts and the rod 17 is impossible.

Another structural feature which adds to the simplicity and ease of assembly and disassembly of the device resides in the single set screw 15 which engages the pivot pin 14 of the handle lever 13. It will be apparent that this set screw 15 is the key that locks the entire tool together.

Obviously, the simplicity of construction and operation of the handling tool of the present invention, and its rugged design, provide an extremely practical and efficient remote control handling device wherein all points of possible failure are maintained at a bare minimum. The provision of adjusting means for predetermining the extent of opening of the jaws and the arrangement whereby the jaws can be forcefully opened in an emergency are also highly important features from the standpoint of accuracy and safety of operation with a minimum of effort and fatigue.

From the foregoing, it is believed that the invention may be readily understood by those skilled in the art without further description, it being borne in mind that numerous changes may be made in the details disclosed without departing from the spirit of the invention as set forth in the following claims.

I claim:

1. A remote control article handling tool for manipulating articles in a plane below the level of the operator's hands, comprising an elongated tube, a laterally projecting tube supporting handle grip on one end of said tube having a longitudinal channel in its upper side, a handle lever pivotally mounted intermediate its ends in said channel and coacting with said grip, the upper portion adjacent one end of said lever normally lying in a plane above the upper confines of said channel, a jaw actuating assembly slidable longitudinally in said tube, a transverse slot extending centrally through the upper end of said actuating assembly, an extension on the opposite end of said handle lever operatively engaging said slot to shift said assembly longitudinally in said tube, a bifurcated jaw housing connected to the lower end of said tube, a pair of coacting jaws in the bifurcation of said housing, common pivot means free of said housing, connecting one end of each jaw to the lower end of said actuating assembly, and cam means coacting with said housing and respective jaws to control the pivotal movement of said jaws in opening and closing.

2. A tool as claimed in claim 1, wherein the upper end of said actuating assembly normally projects above the connection of said handle grip to said tube, and means on the projecting upper end of said assembly for abutting said handle grip connection to limit the downward movement of said assembly in said tube.

3. A tool as claimed in claim 2, wherein said last-named means is adjustable longitudinally on said projecting end to selectively control the extent of the downward movement of said assembly in said tube.

4. A remote control article handling tool, comprising an elongated tube, a laterally projecting handle grip on one end of said tube, a pivotally mounted handle lever coacting with said grip, a jaw actuating assembly slidable longitudinally in said tube, said jaw actuating assembly including a cylindrical head at its upper end slidably embracing the interior of said tube, a guide cylinder at its lower end slidably embracing said tube, and an intermediate connecting rod screw threadedly engaging and longitudinally spacing said head and guide cylinder, whereby the overall length of said assembly may be adjusted, a transverse slot extending centrally through said head, an extension on one end of said handle lever operatively engaging said slot to shift said assembly longitudinally in said tube, said extension coacting with said slot to prevent rotation of said assembly in said tube, a bifurcated jaw housing connected to the lower end of said tube, a pair of coacting jaws in the bifurcation of said housing, common pivot means free of said housing connecting one end of each jaw to the guide cylinder at the lower end of said actuating assembly, cam means coacting with said housing and respective jaws to control the pivotal movement of said jaws in opening and closing, and means associated with the head of said actuating assembly for limiting the downward movement thereof within said tube to thereby control the maximum opening of said jaws.

References Cited by the Examiner

UNITED STATES PATENTS

| 163,003 | 5/1975 | De Leidi | 294—115 |
| 1,868,947 | 7/1932 | Manning | 251—237 |

FOREIGN PATENTS

| 88,028 | 5/1958 | Netherlands. |
| 539,531 | 9/1941 | Great Britain. |

M. HENSON WOOD, JR., *Primary Examiner.*

ANDRES H. NIELSEN, SAMUEL F. COLEMAN, *Examiners.*